| United States Patent [19] | [11] Patent Number: 5,057,392 |
| --- | --- |
| McCabe et al. | [45] Date of Patent: Oct. 15, 1991 |

[54] LOW FUSING TEMPERATURE TONER POWDER OF CROSS-LINKED CRYSTALLINE AND AMORPHOUS POLYESTER BLENDS

[75] Inventors: John M. McCabe, Pittsford; John C. Wilson, Rochester, both of N.Y.

[73] Assignee: Eastman Kodak Company, Rochester, N.Y.

[21] Appl. No.: 563,003

[22] Filed: Aug. 6, 1990

[51] Int. Cl.$^5$ .......................... C08F 20/00; G03G 9/08
[52] U.S. Cl. .................................... 430/109; 430/110; 525/438; 525/444
[58] Field of Search ................ 525/438, 444; 430/109, 430/160

[56] References Cited

U.S. PATENT DOCUMENTS

| | | | |
|---|---|---|---|
| 3,853,778 | 12/1979 | Buckley et al. | 430/109 |
| 4,065,438 | 12/1977 | Verborgt | 525/438 |
| 4,125,571 | 11/1978 | Scott et al. | 525/444 |
| 4,131,714 | 12/1978 | Karkoski | 525/444 |
| 4,140,644 | 2/1979 | Sandhu et al. | 430/109 |
| 4,145,370 | 3/1979 | Sreeves | 525/438 |
| 4,385,107 | 5/1983 | Tanaka et al. | 430/109 |
| 4,442,270 | 4/1984 | Passmore et al. | 525/438 |
| 4,528,257 | 7/1985 | Polderman et al. | 430/109 |
| 4,576,997 | 3/1986 | Trotter et al. | 525/444 |

FOREIGN PATENT DOCUMENTS

| | | |
|---|---|---|
| 65146 | 8/1981 | Japan . |
| 8402144 | 6/1984 | World Int. Prop. O. . |

*Primary Examiner*—Patricia Short
*Assistant Examiner*—Thomas Hamilton, III.
*Attorney, Agent, or Firm*—Dressler, Goldsmith, Shore, Sutker & Milnamow

[57] ABSTRACT

A low fusing temperature toner powder with excellent keep and grindability characteristics is provided which employs a polyblend of a crystalline polyester and an amorphous polyester that has been cross-linked with an epoxy novolac resin in the presence of a crosslinking catalyst.

13 Claims, No Drawings

LOW FUSING TEMPERATURE TONER POWDER OF CROSS-LINKED CRYSTALLINE AND AMORPHOUS POLYESTER BLENDS

FIELD OF THE INVENTION

This invention is in the field of low fusing temperature toner powders of blended crystalline and cross-linked amorphous polyesters.

BACKGROUND OF THE INVENTION

In the art of electrophotography, there is a need for relatively low fusing temperature toner powders. These toners not only reduce power consumption and copier warm up time, but also increase the duty life of machine components in copiers because of inherent reduced heat spillage from the fuser subsystem. These toners also permit higher speed fusing and reduce problems with paper receivers.

To achieve such results, various approaches have been tried. One approach has been to use low molecular weight linear amorphous polymers, with a low $T_g$. However, these polymers result in poor toner powder keeping characteristics and very little offset latitude. They also require the use of excessive wicking fluid quantities.

Another approach has been to use cross-linked polyester toners that utilize low molecular weight polymers that are cross-linked to provide suitable offset latitudes. However, these toners suffer from fusing temperatures that are too high.

Still another approach has been to use blends of crystalline and amorphous resins to reduce toner fusing temperatures (as taught in Japanese Laid-Open patent application Kokai No. 65146/1981). However, toners of these blends display poor keeping properties.

So far as now known, prior art approaches have not solved the problem of producing a low fusing temperature toner powder with desired keeping and grindability characteristics.

SUMMARY OF THE INVENTION

This invention relates to low fusing temperature toner powders for electrophotographic usage, polyblends useful in such toner powders, and processes for making the polyblends.

The present invention employs a mixture of crystalline and amorphous polyester polymers in combination with a low molecular weight epoxy novolac resin and a crosslinking catalyst. The crystalline polymer melts at a relatively low temperature $(T_m)$ and has a relatively low glass transition temperature $(T_g)$ while the amorphous polymer has a higher $T_g$. The amorphous polyester is cross-linked during melt blending by the technique provided herein. The polyblend provides a low fusing temperature and good offset latitude for the toner powder made therewith. The toner powders provide excellent keep and low temperature heat fusing characteristics.

The crystalline polyester is blendable with the amorphous polyester at elevated temperature, yet the crystalline polyester remains crystallizable at an annealing temperature applied following melt blending as taught herein.

Processes for making the polyblends of this invention are provided wherein the mixtures are extruded and then annealed.

Various other features, advantages, aims, purposes, embodiments, and the like of this invention will be apparent to those skilled in the art from the present specification and claims.

DETAILED DESCRIPTION

(a) Definitions

The term "particle size," as used herein, or the term "size," or "sized" as employed herein in reference to the term "particles," means volume weighted diameter as measured by conventional diameter measuring devices, such as a Coulter Multisizer, sold by Coulter, Inc. Mean volume weighted diameter is the sum of the mass of each particle times the diameter of a spherical particle of equal mass and density, divided by total particle mass.

The term glass transition temperature' or "$T_g$" as used herein means the temperature at which a polymer changes from a glassy state to a rubbery state. This temperature $(T_g)$ can be measured by differential thermal analysis as disclosed in "Techniques and Methods of Polymer Evaluation," Vol. 1, Marcel Dekker, Inc., N.Y. 1966.

The term "melting temperature" or "$T_m$" as used herein means the temperature at which a polymer changes from a crystalline state to an amorphous state. This temperature $(T_m)$ can be measured by differential thermal analysis as disclosed in "Techniques and Methods of Polymer Evaluation".

The term "low molecular weight" as used herein means a number average molecular weight under about 2,500.

The term "crystalline" as used herein in relation to a polymer means that the polymer is one that is semi-crystalline and shows at least one definite crystalline melting point as well as a small low-temperature glass transition point.

The term "amorphous" as used herein in relation to a polymer means that the polymer shows only a well-defined glass transition point.

The term "reactable carboxyl groups per molecule" as used herein in relation to a polymer means that the polymer contains pendant and/or terminal carboxyl groups in an acid form that are reactable with a low molecular weight epoxy novolac resin.

The term "reactable hydroxyl groups per molecule" as used herein in relation to a polymer means that the polymer contains pendant and/or terminal hydroxyl (—OH) groups that are reactable with an acidic moiety, such as pyromellitic dianhydride.

The term "polyblend" as used herein means a mechanical mixture of two or more polymers that have been melt blended together.

The term "charge control agent" as used herein means a substance which alters the triboelectric charging capacity of toner particles.

(b) Preparation Process and Starting Materials

In preparing a polyblend of this invention, one mechanically mixes together a crystalline polyester, a carboxylated amorphous polyester, a low molecular weight epoxy novolac resin and a crosslinking catalyst.

The crystalline polyester has a glass transition temperature in the range of about −5° to about 10° C. and a melting temperature in the range of about 80° to about 110° C. The crystalline polyester has a number average molecular weight in the range of about 1000 to about 3000 and a weight average molecular weight in the range of about 2000 to about 6000. As those skilled in the art will appreciate, the crystalline polyester can have many possible structures depending upon such variables as the monomers used for polycondensation and the condensation conditions employed.

A present preference is to employ a crystalline polyester that has an inherent viscosity in dichloromethane in the range of about 0.05 to about 0.75 and more preferably in the range of about 0.1 to about 0.3.

One presently preferred class of crystalline polyesters is linear and comprises on a 100 mole percent basis:
about 50 to about 100 mole percent 1,6-hexanediol;
about 0 to about 50 mole percent 1,4-butanediol;
about 70 to about 100 mole percent terephthalic acid; and
about 0 to about 30 mole percent isophthalic acid.

An example of a presently particularly preferred crystalline polyester and its preparation is described in Example 1 below. This polymer has a $T_g$ in the range of about $-5°$ to about 5° C., and a $T_m$ in the range of about 95° to about 105° C.

The amorphous polyester has a glass transition temperature in the range of about 50° to about 90° C. (and preferably about 55° to 75° C.); and an average of about 0.10 to about 1.0 reactable carboxyl groups per molecule. The amorphous polyester also has a number average molecular weight in the range of about 1000 to about 3000 and a weight average molecular weight in the range of about 2000 to about 9000.

As those skilled in the art will appreciate, the amorphous polyester can have many structures depending upon such variables as the monomers used for polycondensation and the condensation conditions employed. For example, the presence of a suitable molar excess of polyhydroxylated compound can be used to regulate the molecular weight of the polyester. All or a chosen portion of the hydroxyl groups can then be reacted (carboxylated) with a polycarboxylic acid anhydride to achieve a quantity of reactable carboxyl groups per molecule. Suitable acid anhydrides are preferably aromatic and preferably contain at least two carboxyl groups per molecule when in the hydrated (or acid) form. Examples of suitable anhydrides include pyromellitic dianhydride, trimellitic anhydride, phthalic anhydride 3,3',4,4'-benzophenonetetracarboxylic dianhydride, glutaric anhydride, succinic anhydride, maleic anhydride, and the like. The carboxylation reaction of a polyester with such an acid anhydride is conveniently carried out at elevated temperature under liquid phase conditions.

Tri or tetra functional carboxylic acids can also be employed for condensation with diols using conditions which result in polyesters that contain a desired quantity of reactable carboxyl groups per molecule.

One presently preferred class of amorphous polyesters comprises:
about 50 to about 99 mole percent terephthalic acid;
about 0 to 49 mole percent additional diacid(s);
about 1 to about 15 mole percent trimellitic anhydride;
about 50 to about 100 mole percent neopentyl glycol; and
0 to about 50 mole percent 1,4-cyclohexanedimethanol.

It should be noted that mole percents for the polyacid components are based upon total polyacid components and glycol mole percents are based upon total glycol components.

The polyester has a $T_g$ in the range of about 58° to 65° C. and contains an average of about 0.1 to about 1.0 reactable carboxyl groups per molecule.

The low molecular weight epoxy novolac resin has about 2 to about 6 epoxide groups per molecule.

The term "epoxy novolac resin" as used herein means an epoxy resin made by the reaction of epichlorohydrin with a novolac resin. An epoxy novolac resin has the pendant repeating epoxide structure:

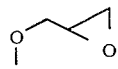

A novolac resin is a condensate of a phenol compound with formaldehyde in the presence of acid catalysts. The phenol compound can be phenol itself, or such compounds as the cresols, xylenols, resorcinol, naphthols, and the like. Epoxy novolac resins used in the practice of this invention have epoxy functionalities which are typically in the range of about 2.5 to about 6.

One presently preferred class of epoxy novolac resins comprises epoxy cresol novolac resins having a molecular weight in the range of about 500 to about 1,300. These resins are prepared by the condensation of cresol and formaldehyde followed by reaction with epichlorohydrin to produce a polymer having an epoxy functionality in the range of about 2.5 to about 6.

An example of a presently particularly preferred epoxy cresol novolac resin is characterized by the structure:

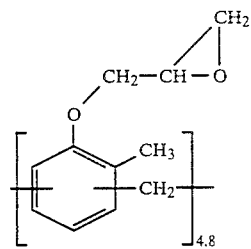

This epoxy resin is obtainable from Ciba-Geigy Corp. under the trade designation "ECN 1273" and has an epoxy functionality of about 4.8.

Examples of suitable catalysts include a phenyl imidazoline such as Hardener B-31 available from huls Chemische Werke.

Suitable charge control agents for use in toner powders of the present invention are disclosed, for example, in U.S. Pat. Nos. 3,893,935; 4,079,014; and 4,323,634; and British Patent Nos. 1,501,065 and 1,420,839. Charge control agents are generally employed in small quantities, such as about 0.1 to about 3 weight percent on a total toner powder weight basis, and preferably, about 0.2 to about 1.5 weight percent.

Suitable dyes and pigments for use in toner powders of the present invention are disclosed, for example, in U.S. Pat. No. Re. 31,072. One particularly useful colorant for toners to be used in black and white electrophotographic copying machines is carbon black. When employed, colorants are generally present in quantities in the range of about 1 to about 30 weight percent on a total toner powder weight basis, and preferably about 1 to about 8 weight percent.

A further optional but preferred material is a crystallization promoter for the crystallization of polyester resins. Examples include inorganic pigments, such as aluminum silicates, titanium dioxide, and the like; polyethylenes, such as those available commercially under the name Epolenes from Eastman Kodak Company, and the like; ionomers, such as those available from E. I. DuPont de Nemours & Company; and the like.

A summary of the Composition of a starting mixture is shown in Table I below:

TABLE I

| Component | Weight percent (100 wt/% basis) | | |
|---|---|---|---|
| | Broad | Preferred | Most Preferred |
| Crystalline Polyester | about 25–75 | about 40–60 | about 50 |
| Amorphous polyester | about 25–75 | about 40–60 | about 50 |
| Epoxy Novolac resin | about 2–6 | about 3–5 | about 4 |
| Crosslinking catalyst | 0–about 2.0 | about 0.5–1.5 | about 0.9 |
| Charge control agent (optional) | | | |
| Colorant | 0–about 15 | about 3–10 | about 5 |
| Crystallization promoter | 0–about 5 | about 0.5–2 | about 1.5 |

Uniform mixtures of materials are preferred to achieve a uniform crosslinked polyblend product after melt blending.

The starting materials are typically solids at ambient conditions. Preferably, the starting particle size of the starting materials is less than about ¼" and more preferably is in the range of about 50 to about 500 microns.

The mixture is melt blended on heated compounding rolls or by passage through an extruder, or the like. Melt blending is accomplished at a temperature in the range of about 150° to about 240° C., and preferably in the range of about 180° to about 220° C.

Melt blending times (that is, the exposure period for melt blending temperatures) are sufficient to allow the reaction to be complete. Typically they are in the range of about 10 to about 20 minutes if a roll mill is utilized and about 1 to about 2 minutes if an extruder is utilized.

During melt blending, the amorphous polyester is crosslinked with the epoxy novolac resin. Cross-linking substantially increases the offset latitude of the mixture.

After melt blending (preferably by extrusion), the mixture is annealed by being maintained at a temperature above the glass transition temperature of the amorphous polyester, but below the melting temperature of crystalline polyester. A present preference is to employ an annealing temperature in the range of about 50° to about 80° C. The annealing is continued for a time sufficient for the crystalline polyester to recrystallize as dispersed small particles within a matrix phase comprised of a cross-linked polymeric reaction product of the amorphous polyester and the epoxy novolac resin.

Typical and illustrative annealing times are in the range of about 0.2 to about 2 hours.

The annealed mixture is then cooled and can either be stored or used directly for toner particle manufacture by grinding.

Grinding of an annealed polyblend mixture of this invention can be carried out by any convenient procedure. For example, the solid mixture can be crushed and ground to a desired particle size using, for instance, a fluid energy or jet mill, such as is described in U.S. Pat. No. 4,089,472. One or more conventional particle classification steps can be used to achieve a toner particle composition having a desired particle size and size distribution.

(c) Product Characteristics

An extruded and cooled polyblend displays excellent grindability characteristics.

In the annealed mixture, it is estimated that the size of the discrete dispersed particles of crystalline polyester are preferably in the size range of about 0.1 to about 2 microns. Somewhat smaller or larger sizes can be used if desired.

If annealing is not carried out, the polyblend does not have the desired grindability and the toner powder derived therefrom does not have desired fusing temperature and keep characteristics. If, for example, the extrudate is rapidly quenched in water and then ground, it is found that the material is quite rubbery and difficult to grind.

Toner particles can have a particle size in the range of about 3 to about 20 microns and preferably in the range of about 8 to about 12 microns. In a toner powder derived from the most preferred starting materials a fusing temperature in the range of about 220° to about 300° C., preferably about 250° C. is obtained.

In the polyblend, the amorphous polyester is only partially crosslinked. Regulation of the extent of crosslinking controls product properties such as offset latitude, $T_g$, and fusing temperature of the toner powder. The level of crosslinking is conveniently indicated as the torque level on a Brabender Plasticorder. In general, the level of crosslinking (by Brabender torque) is in the range of about 50 to 250, preferably in the range of about 75–200, and a presently most preferred range is about 150–200 meter-grams.

The degree of crosslinking can also be characterized by the percentage of THF soluble polymer in the blend. The solubility may range from 50–95%, preferably 65–85%.

Toner powders display excellent keeping qualities.

The melting temperature of the substantially crystalline polyester resin may have an influence upon achievement of desired fusing temperature in a toner powder derived from a polyblend of this invention.

In an attempt to achieve better compatibility of the crystalline and amorphous polymers, cross-linkable varieties of the crystalline polyester material were evaluated, including a polyester made with a small amount of trimellitic anhydride and a carboxyl group terminated polyester condensate. It was found that the use of such a cross-linkable crystalline polyester gave a mixture with poor keep. It is theorized (and there is no intent to be bound by theory herein) that the observed poor keep probably resulted because the two respective polymers could not separate into two phases by crystallization of the substantially crystallized polyester as in an annealing step.

The invention is illustrated by the following examples:

EXAMPLE 1

Crystalline Very Low Molecular Weight Polyester

A 3-neck 2 liter flask equipped with a metal blade stirrer, thermocouple, nitrogen inlet tube and steam heated partial condensing column leading to a water cooled receiver was charged with a mixture of 439.45 g (3.718 mol) of 1,6-hexanediol and 83.78 g (0.930 mol) of 1,4-butanediol. The mixture was heated to 150° C.

under nitrogen with a heating mantle. A mixture of 486.93 g (2.931 mol) of terephthalic acid, 121.73 g (0.733 mol) of isophthalic acid and 1.0g of butylstannoic acid was added to the stirred mixture of glycols. The temperature was then raised to 210° C. over 35 minutes. Water from the reaction was collected in the receiver. The reaction was continued for another 17 hours at about 210° C. The temperature was raised to 230° C. and after 2 hours, water aspirator vacuum was applied to the reaction vessel after removing the column and receiver. Stirring at 230° C. was continued for 40 minutes after which the polymer was isolated.

IV(DCM)=0.09
$CO_2H$=0.01 meq/g
$T_m$=98.9° C.
$CO_2H$=0.01 meq/g
$T_m$=98.9° C.

The polymer had the following structure:

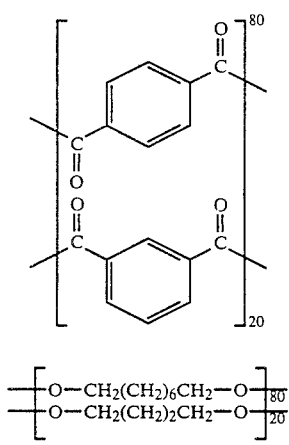

EXAMPLE 2

Crystalline Low Molecular Weight Polyester

This polymer was prepared in the manner of Example 1 from 414.63 g (3.509 mol) of 1,6-hexanediol, 79.05 g (0.877 mol) of 1,4-butanediol, 517.10 g (3.112 mol) of terephthalic acid, 129.28 g (0.778 mol) of isophthalic acid and 1.0 g of butylstannoic acid.

IV(DCM)=0.16
$CO_2H$=0.02 meq/g
$T_g$=−1.5° C.
$T_m$=101.8° C.

EXAMPLE 3

Crystalline Low Molecular Weight Acid Terminated Polyester

This polymer was prepared in the manner of Example 1 from 404.05 g (3.419 mol) of 1,6-hexanediol, 77.03 g (0.855 mol) of 1,4-butanediol, 529.97 g (3.190 mol) of terephthalic acid, 132.49 g (0.797 mol) of isophthalic acid and 1.0 g of butylstannoic acid.

EXAMPLE 4

Crystalline Low Molecular Weight Acid Terminated/Pendant Polyester

This polyester was prepared in the manner of Example 1 from 413.72 g (3.501 mol) of 1,6-hexanediol, 91.16 g (0.875 mol) of neopentyl glycol, 556.08 g (3.347 mol) of terephthalic acid and 1.0 g of butylstannoic acid without aspirator vacuum. Prior to isolation, this polymer was treated with 73.25 g (0.381 mol) of trimellitic anhydride for 5.25 hours at 230° C.

$CO_2H$=0.16 meq/g
$T_g$=0.00° C.
$T_m$=91.7° C.

EXAMPLE 5

Amorphous Low Molecular Weight Polyester with High $T_g$

This polymer was prepared in the manner of Example 4 from 432.94 g (4.156 mol) of neopentyl glycol, 416.94 g (2.510 mol) of terephthalic acid, 203.53 g (0.627 mol) of 1,1,3-trimethyl-3-(4-carboxyphenyl)indan-5-carboxylic acid, and 1.0 g of butyl stannoic acid with subsequent treatment with 73.25 g (0.381 mol) of trimellitic anhydride at 230° C. for 4 hours followed by water aspirator vacuum for 5 minutes and atmospheric pressure for 15 minutes. The polymer was then isolated.

$CO_2H$=0.24 meq/g.
$T_g$=77° C.

EXAMPLE 6

Amorphous Low Molecular Weight Polyester

This polymer was prepared in the manner of Example 5 from 453.93 g (4.358 mol) of neopentyl glycol, 498.41 g (3.000 mol) of terephthalic acid, 108.13 g (0.333 mol) of 1,1,3-trimethyl-3-(4-carboxyphenyl)indan-5-carboxylic acid, 1.0 g of butyl stannoic acid and 73.25 g (0.381 mol) of trimellitic anhydride.

$CO_2H$=0.19 meq/g
$T_g$=71° C.

EXAMPLE 7

Crystalline Low Molecular Weight Polyester

This polymer was prepared in the manner of Example 1 from 263.03 g (2.226 mol) of 1,6-hexanediol, 200.58 g (2.226 mol) of 1,4-butanediol, 684.77 g (4.122 mol) of terephthalic acid and 1.0 g of butylstannoic

IV(DCM)=0.26

EXAMPLE 8

Amorphous Low Molecular Weight Polyester

This polymer can be prepared in the manner of Example 4 from 218.31 g (1.514 mol) of 1,4-cyclohexanedimethanol, 292.81 g (2.811 mol) of neopentyl glycol, 548.11 g (3.299 mol) of terephthalic acid and 1.0 g of butylstannoic acid followed by treatment with 73.25 g (0.381 mol) of trimellitic anhydride.

$CO_2H$=0.19 meq/g
$T_g$=66.8° C.

The polymer had the following structure:

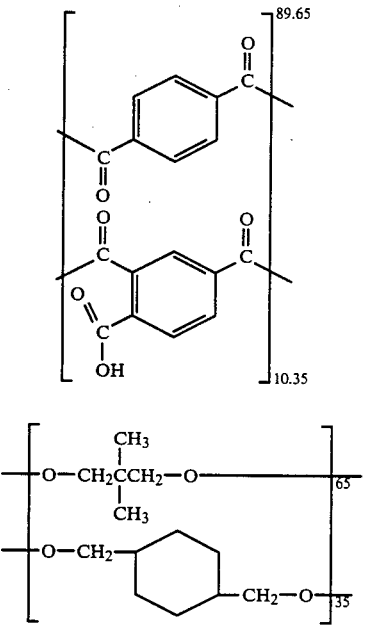

EXAMPLE 9

Toner Powder Preparation and Explanation
(Comparison and Control)

A toner powder was prepared by pre-melt-blending together the following components on an 8" roll mill at 100° C. for 10 minutes:

| Comonent | Amount |
| --- | --- |
| amorphous polyester | 60.0 gms |
| epoxy resin | 1.86 gms |
| crosslinking catalyst | 0.60 gms |
| carbon black | 3.67 gms |

The amorphous polyester was obtained from the Cargill Company as "SG 412". The epoxy resin was obtained from Ciba-Geigy Company as "ECN1273". The crosslinking catalyst was obtained from Hüls GMBH as Hardener B-31. The carbon black was obtained from Cabot Corporation as "Regal TM 300".

The resulting composition was then processed in a Brabender TM Plasticorder (available from C. W. Brabender Company of Hackensack, N.J.) at 200° C. at 90 rpm for 10 minutes. The processed material was then air-pulverized pulverized in a Trost TM mill (available from Garlock, Inc. of Newtown, Pa.) to achieve toner sized particles.

This toner powder was evaluated by laying-down patches at a transmission optical density ranging from 1.0–1.2 on Husky bond paper and fusing with a Silverstone fusing roll in a fusing device at various temperatures. The fused sample was then creased with a hard roller, opened flat, and rubbed with a gum eraser covered with Kleenex tissue to remove any loose toner. The width of the crack was then compared to a set of crack standards. The crack standards go from excellent down to unfused in steps of e(excellent), g(good), f(fair), p(poor), and unfused. The temperature at which the fused toner achieved a rating of "f" was called the fusing temperature.

An additional performance evaluation of this toner powder was that of keeping. A sample of the toner was placed in a small glass vial, and a metal weight placed on top of the toner. The sample was kept in a 52° C. oven for three days. After cooling the sample it was removed from the vial and the ease of breaking-up the toner powder into loose particles was evaluated. The range of this test was from totally fused toner to excellent (no loss of flowability of the original powder). Commercial toners range from P(poor) to E(excellent) in this test.

Fusing quality and keep as measured, are shown in Table II below.

EXAMPLE 10

Toner Power Preparation and Evaluation

A toner powder was prepared as described in Example 9 except that a crystalline polyester polymer was added. This crystalline polymer had acid termination so that it could be crosslinked with the epoxy resin.

The toner was prepared by preblending the following components:

| | |
| --- | --- |
| SG 412 (Cargill amorphous polyester) | 54.0 g |
| Crystalline polyester of Example 4 | 6.0 |
| ECN 1273 (Ciba-Geigy epoxy resin) | 1.86 |
| Hardener B-31 (hüls catalyst) | 0.60 |
| Regal 300 carbon black | 3.67 |

The crystalline polyester was prepared as described in Example 4 above.

Fusing quality and keep as measured are shown in Table II below.

EXAMPLE 11

Toner Powder and Evaluation

A toner powder was prepared as described in Example 10 except that the same crystalline polymer was added at a different level, as follows:

| | |
| --- | --- |
| SG 412 (Cargill amorphous polyester) | 45.0 g |
| Crystalline Polyester of Example 4 | 15.0 |
| ECN 1273 (Ciba-Geigy epoxy resin) | 1.86 |
| Hardener B-31 (hüls catalyst) | 0.60 |
| Regal 300 carbon black | 3.67 |

Fusing quality and keep as measured are shown in Table II below.

EXAMPLE 12

Toner Powder Preparation and Evaluation

A toner powder was prepared as described in Example 11 except that the same crystalline polymer was added at a different level, as follows:

| | |
| --- | --- |
| SG 412 (Cargill amorphous polyester) | 30.0 g |
| Crystalline Polyester of Example 4 | 30.0 |
| ECN 1273 (Ciba-Geigy epoxy resin) | 1.86 |
| Hardener B-31 (hüls catalyst) | 0.60 |
| Regal 300 carbon black | 3.67 |

Fusing quality and keep as measured are shown in Table II below.

EXAMPLE 13

Toner Powder Preparation and Evaluation (Invention)

A toner powder was prepared as described in Example 12 except that the crystalline polymer added did not have acid termination, the composition being as follows:

| | |
|---|---|
| SG 412 (Cargill amorphous polyester) | 45.0 g |
| Crystalline Polyester* | 15.0 |
| ECN 1273 (Ciba-Geigy epoxy resin) | 1.80 |
| Hardener B-31 (hüls catalyst) | 0.60 |
| Regal 300 carbon black | 3.67 |

*FA-250 available from Eastman Chemicals

Fusing quality and keep as measured are shown in Table II below.

EXAMPLE 4

Toner Powder Preparation and Evaluation

A toner powder was prepared as described in Example 13 except that the crystalline polymer added had the same monomer composition as in Example 12, but did have acid termination, the composition being as follows:

| | |
|---|---|
| SG 412 (Cargill amorphous polyester) | 30.0 g |
| Crystalline Polyester of Example 3 | 30.0 |
| ECN 1273 (Ciba-Geigy epoxy resin) | 1.80 |
| Hardener B-31 (hüls catalyst) | 0.60 |
| Regal 300 carbon black | 3.67 |

Fusing quality and keep as measured are shown in Table II below.

EXAMPLE 15

Toner Powder Preparation and Evaluation (Invention)

A toner powder was prepared as described in Example 13 except that, while crystalline polymer of the same composition was added, the amorphous polymer had a different composition which gave the amorphous polyester a higher $T_g$ (glass transition temperature) of 77° C., the composition being as follows:

| | |
|---|---|
| Amorphous Polyester | 45.0 g |
| Crystalline Polymer of Example 13 | 15.0 |
| ECN 1273 (Ciba-Geigy epoxy resin) | 1.90 |
| Hardener B-31 (hüls catalyst) | 0.60 |
| Regal 300 carbon black | 3.67 |

The amorphous polyester was prepared as described in Example 5 above.

Fusing quality and keep as measured are shown in Table II below.

EXAMPLE 16

Toner Powder Preparation and Evaluation

A toner powder was prepared as described in Example 15 except that, while amorphous polymer had the same composition, the crystalline polymer had acid termination, the composition being as follows:

| | |
|---|---|
| Amorphous Polyester | 45.0 g |
| Crystalline Polymer of Example 14 | 15.0 |
| ECN 1273 (Ciba-Geigy epoxy resin) | 2.30 |
| Hardener B-31 (hüls catalyst) | 0.60 |
| Regal 300 carbon black | 3.67 |

The amorphous polyester was prepared as described in Example 5 above.

Fusing quality and keep as measured are shown in Table II below.

EXAMPLE 17

Toner Powder Preparation and Evaluation (Invention)

A toner powder was prepared as in Example 15 except that, while the crystalline polymer had the same composition, the amorphous polymer had a lower level of one component monomer, giving the resulting polyester a $T_g$ of 71° C., the composition being as follows:

| | |
|---|---|
| Amorphous polymer | 45.0 g |
| Crystalline polymer | 15.0 |
| ECN 1273 (Ciba-Geigy epoxy resin) | 1.90 |
| Hardener B-31 (hüls catalyst) | 0.60 |
| Regal 300 carbon black | 3.67 |

The crystalline polyester was obtained from Eastman Chemicals.

The amorphous polyester was prepared as described in Example 6 above.

Fusing quality and keep as measured are shown in Table II below.

EXAMPLE 18

Toner Powder Preparation and Evaluation (Invention)

A toner powder was made as in Example 13 except that, while the crystalline polymer had the same composition, the molecular weight was lower (i.V.=0.18).

| | |
|---|---|
| SG 412 (Cargill amorphous polyester) | 30.0 g |
| Crystalline polymer of Example 2 | 30.0 |
| ECN 123 (Ciba-Geigy epoxy resin) | 2.70 |
| Hardener B-31 (hüls catalyst) | 0.60 |
| Regal 300 carbon black | 3.67 |

The crystalline polyester was prepared as described in Example 2 above. Fusing quality and keep as measured are shown in Table II below.

EXAMPLE 19

Toner Powder Preparation and Evaluation (Invention)

A toner powder was made as in Example 13 except that, while the crystalline polymer had the same composition, the molecular weight was very low (i.V.=0.09).

| | |
|---|---|
| SG 412 (Cargill amorphous polyester) | 30.0 g |
| Crystalline polymer of Example 1 | 30.0 |
| ECN 123 (Ciba-Geigy epoxy resin) | 2.60 |
| Hardener B-31 (hüls catalyst) | 0.60 |
| Regal 300 carbon black | 3.67 |

The crystalline polyester was prepared as described in Example 1 above.

Fusing quality and keep as measured are shown in Table II below.

EXAMPLE 20

Toner Powder Preparation and Evaluation (Invention)

A toner powder was made as in Example 13 except that, while the crystalline polymer had a similar composition, its monomer content was modified to provide a somewhat higher $T_m$ (melt temperature) of 120° C.

| | |
|---|---|
| SG 412 (Cargill amorphous polyester) | 30.0 g |
| Crystalline polymer of Example 7 | 30.0 |
| ECN 123 (Ciba-Geigy epoxy resin) | 2.40 |
| Hardener B-31 (hüls catalyst) | 0.60 |
| Regal 300 carbon black | 3.67 |

The crystalline polyester as prepared as described in Example 7 above.

Fusing quality and keep as measured are shown in Table II below.

TABLE II

FUSING QUALITY AND KEEP

| Example Number | Feature of Example | Fusing Quality at Temperature | | | | | | | Keep |
|---|---|---|---|---|---|---|---|---|---|
| | | 225 | 250 | 275 | 300 | 325 | 350 | 375 | |
| 9 | Amorphous Control | n.f | n.f | p | p+ | f+ | g+ | e− | G |
| 10 | 10% crosslinkable crystalline additive | — | p | f | g− | g | g+ | e− | fuse |
| 11 | 25% crosslinkable crystalline additive | — | p+ | f | g | g+ | e− | e− | fuse |
| 12 | 50% crosslinkable crystalline additive | — | f | g | g+ | g+ | e− | e− | fuse |
| 13 | 50% High i.v. noncross. crystalline additive | n.f. | n.f. | p+ | f+ | e | e | e | P |
| 14 | 50% acid-terminated crystalline additive | n.f | agglomerated upon grinding | | | | | | |
| 15 | High $T_g$ amorphous resin | n.f | n.f. | n.f | f | g− | g+ | g+ | G |
| 16 | High $T_g$ amorphous resin w/ acid-terminated crystalline additive | n.f | p− | p | f | g | g | g+ | P |
| 17 | Interm. $T_g$ amorp. resin | n.f | n.f. | f | g+ | e− | e− | e | G− |
| 18 | 0.18 i.v. crystal. add. | f+ | g+ | e− | e | e | e | e | F |
| 19 | 0.09 i.v. crystal. add. | poor dispersion quality | | | | | | | |
| 20 | Higher $T_m$ crystal. add. | n.f | n.f | p− | p | g | e− | e | F |

The foregoing specification is intended as illustrative and is not to be taken as limited. Still other variations within the spirit and scope of the invention are possible and will readily present themselves to those skilled in the art.

We claim:

1. A process for preparing a polyblend for a low fusing temperature toner powder comprising the steps of:
   (a) admixing together:
      (1) a crystalline polyester having a glass transition temperature in the range of about −5° to about 10° C., a melting temperature in the range of about 90° to about 110° C.; a number average molecular weight in the range of about 1000 to about 3000 and a weight average molecular weight in the range of about 2000 to about 6000;
      (2) an amorphous polyester having a glass transition temperature in the range of about 55° to about 75° C., a number average molecular weight in the range of about 1000 to about 3000 and a weight average molecular weight in the range of about 2000 to about 9000 and containing an average of about 0.1 to about 1.0 reactable carboxyl groups per molecule;
      (3) a low molecular weight epoxy novolac resin having an epoxy functionality in the range of about 2.5 to about 6; and
      (4) a crosslinking catalyst;
   (b) melt blending the mixture at a temperature in the range of about 150° to about 240° C.; and
   (c) annealing the melt blended mixture at a temperature above the glass transition temperature of said amorphous polyester and below the melting temperature of said crystalline polyester for a time sufficient for said crystalline polyester to recrystallize as dispersed small particles within a matrix phase comprised of a cross-linked polymeric reaction product of said amorphous polyester and said epoxy novolac resin.

2. The process of claim 1 wherein said melt blending is carried out by passing said mixture through an extruder.

3. The process of claim 1 wherein said mixture additionally includes a charge control agent.

4. The process of claim 1 wherein said mixture additionally includes a colorant.

5. The process of claim 1 wherein said mixture additionally includes crystallization nucleators and/or promotors.

6. The process of claim 1 wherein following step c, the annealed melt blended mixture is ground into toner particles.

7. The process of claim 1 wherein said crystalline polyester is linear and comprises the reaction product of:

about 50 to about 100 mole percent 1,6-hexanediol;
about 0 to about 50 mole percent 1,4-butanediol;
about 70 to about 100 mole percent terephthalic acid; and
about 0 to about 30 mole percent isophthalic acid.

8. The process of claim 1 wherein said amorphous polyester is linear and comprises the reaction product of:

about 50 to about 99 mole percent terephthalic acid;
about 0 to about 49 mole percent additional diacid(s);
about 1 to about 15 mole percent trimellitic anhydride;
about 50 to about 100 mole percent neopentyl glycol; and 0 to about 50 mole percent of 1,4-cyclohexanedimethanol.

9. The process of claim 1 wherein said epoxy novolac resin is a condensate of o-cresol and formaldehyde which has been reacted with epichlorohydrin and has an epoxy functionality in the range of about 4 to about 6.

10. A polyblend produced by the process of claim 1.

11. A polyblend of:
(a) a crystalline polyester that comprises the reaction product of:
   about 50 to about 100 mole percent 1,6-hexanediol;
   about 0 to about 50 moles 1,4-butanediol;
   about 70 to about 100 mole percent terephthalic acid;
   about 0 to about 30 mole percent isophthalic acid;
(b) an amorphous polyester that comprises the reaction product of:
   about 50 to about 99 mole percent terephthalic acid;
   about 0 to about 49 mole percent additional diacid(s);
   about 1 to about 15 mole percent trimellitic anhydride;
   about 50 to about 100 mole percent neopentyl glycol; and
   0 to about 50 mole percent 1,4-cyclohexanedimethanol; and
(c) an epoxy novolac resin that is a condensate of o-cresol and formaldehyde that has been reacted with epchlorohydrin and has an epoxy functionality in the range of about 4 to about 6.

12. A toner powder produced by the process of claim 6 that has a fusing temperature in the range of about 220° to about 300° C.

13. A toner powder produced by grinding a polyblend of claim 11 and which has a fusing temperature of about 250° F.

* * * * *

UNITED STATES PATENT AND TRADEMARK OFFICE
CERTIFICATE OF CORRECTION

PATENT NO. : 5,057,392  
DATED : October 15, 1991  
INVENTOR(S) : McCabe et al.

Page 1 of 3

It is certified that error appears in the above-identified patent and that said Letters Patent is hereby corrected as shown below:

Column 7, line 3    "1.0g" should be --1.0g--.

Column 13, line 16    "as" (first occurrence) should be --was--

Column 16, line 13    "epchlorohydrin" should be --epichlorohydrin--.

UNITED STATES PATENT AND TRADEMARK OFFICE
CERTIFICATE OF CORRECTION

PATENT NO. : 5,057,392

DATED : October 15, 1991

INVENTOR(S) : McCabe et al.

It is certified that error appears in the above-identified patent and that said Letters Patent is hereby corrected as shown below:

Column 13, Table II   Should read as follows:

TABLE II
FUSING QUALITY AND KEEP

| Example Number | Feature of Example | Fusing Quality at Temperature (°F) | | | | | | | Keep |
|---|---|---|---|---|---|---|---|---|---|
| | | 225 | 250 | 275 | 300 | 325 | 350 | 375 | |
| 9 | Amorphous Control | n.f | n.f | p | p+ | f+ | g+ | e- | G |
| 10 | 10% crosslinkable crystalline additive | - | p | f | g- | g | g+ | e- | fuse |
| 11 | 25%  "   "   " | - | p+ | f | g | g+ | e- | e- | fuse |
| 12 | 50%  "   "   " | - | f | g | g+ | g+ | e- | e- | fuse |
| 13 | 50% High i.v. noncross. crystalline additive | n.f | n.f. | p+ | f+ | e | e | e | P |
| 14 | 50% acid-terminated crystalline additive | n.f | agglomerated upon grinding | | | | | | |
| 15 | High $T_g$ amorphous resin | n.f | n.f. | n.f | f | g- | g+ | g+ | G |
| 16 | " w/ acid-terminated crystalline additive | n.f | p- | p | f | g | g | g+ | P |
| 17 | Interm. $T_g$ amorp. resin | n.f | n.f. | f | g+ | e- | e- | e | G- |
| 18 | 0.18 i.v. crystal. add. | f+ | g+ | e- | e | e | e | e | F |
| 19 | 0.09 i.v. crystal. add. | poor dispersion quality | | | | | | | |
| 20 | Higher $T_m$ crystal. add. | n.f | n.f | p- | p | g | e- | e | F |

UNITED STATES PATENT AND TRADEMARK OFFICE
CERTIFICATE OF CORRECTION

PATENT NO. : 5,057,392  Page 3 of 3
DATED : October 15, 1991
INVENTOR(S) : John McCabe, et al.

It is certified that error appears in the above-identified patent and that said Letters Patent is hereby corrected as shown below:

| | | | | | | | | |
|---|---|---|---|---|---|---|---|---|
| 19 | 0.09 i.v. crystal. add. | | | poor dispersion quality | | | | |
| 20 | Higher $T_m$ crystal. add. | n.f | n.f | p- | p | g | e- | e  F |

Signed and Sealed this

Fourth Day of May, 1993

Attest:

MICHAEL K. KIRK

*Attesting Officer*   Acting Commissioner of Patents and Trademarks